United States Patent
Iwaguchi et al.

(10) Patent No.: US 6,612,491 B1
(45) Date of Patent: *Sep. 2, 2003

(54) BAR CODE READING FOR PROVIDING IMPROVED READING AND STORAGE BY DETECTING TRASH DATA

(75) Inventors: Isao Iwaguchi, Kawasaki (JP); Shinichi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/249,615

(22) Filed: May 26, 1994

(30) Foreign Application Priority Data

Sep. 14, 1993 (JP) .............................. 5-229043

(51) Int. Cl.⁷ ................................................ G06K 7/10
(52) U.S. Cl. ...................................... 235/437; 235/463
(58) Field of Search .................... 235/463, 436, 235/437

(56) References Cited

U.S. PATENT DOCUMENTS 5,336,874 A * 8/1994 Hasegawa .................. 235/466

FOREIGN PATENT DOCUMENTS

| JP | 290578 | * 12/1986 | ................. 235/463 |
| JP | 61-290578 | 12/1986 | |

* cited by examiner

Primary Examiner—John Shepperd
(74) Attorney, Agent, or Firm—Staas & Halsey LLP

(57) ABSTRACT

The present invention relates to a bar code reading method and a bar code reader each suitably used for terminal equipment such as a POS terminal. The object is to perform an improved bar code reading rate and an improved effective bar code storage efficiency by detecting trash data so as not to store it in a memory. The bright and dark information on the bar width of a bar code 1 is detected to convert it into binary information. Plural pieces of the converted binary information are stored and then are sequentially outputted on a first-in, first-out basis. In the binary information storing operation, continuous binary information of which the bright and dark information of the bar code 1 does not come alternately is detected as error information. When error information is continuously detected, only the last data of the continuous binary information is stored but the remaining data are erased.

9 Claims, 13 Drawing Sheets

US 6,612,491 B1

BAR CODE READING FOR PROVIDING IMPROVED READING AND STORAGE BY DETECTING TRASH DATA

BACKGROUND OF THE INVENTION

1) Field of the Invention

The present invention relates to a bar code reading method and a bar code reader each used for terminal equipment such as point of sales (POS) terminal.

2) Description of the Related Art

FIG. 12 is a block diagram showing a configuration of the bar code reading device (bar code reader). Referring now to FIG. 12, numeral 31 represents a bar code printed on a surface of an article, the bar code being generally formed of plural black bars and white bars arranged alternately. A predetermined datum is represented based on the width of each black bar and the width of each white bar.

An optical system 32 irradiates a laser beam L2 onto the bar code 31 and receives a reflected light R1, or a laser beam L2 reflected on the bar code 31. The optical system 32 also is constituted of a laser emitting unit 33, a scanning mechanism 34, and an optical converting unit 35. The laser emitting unit 33 includes a semiconductor laser device for emitting the laser beam L1.

The scanning mechanism 34 is constituted of a polygon mirror that is rotatably driven with, for example, a motor. The scanning mechanism 34 also irradiates the laser beam L2 to the plural black bars and white bars forming the bar code 31, the beam L2 formed by reflecting the laser beam L1 from the laser emitting unit 33, while it moves and scans the laser beam at a fixed rate and in the direction perpendicular to the black and white bars of the bar code 31.

The scanning mechanism 34 irradiates the reflected light R1 as the reflected light R2 to the photoelectric converting unit 35, the reflected light R1 being the laser beam L2 reflected by the bar code 31 and traveled with the laser beam L2 scanned.

The photoelectric converting unit 35 is formed of a photoelectric converting element, for example, a photo diode. The photoelectric converting unit 35 also receives the reflected light R2 (light input signal) via the scanning mechanism 34 to convert it into an electric signal (analog value) corresponding to the light amount thereof.

The A/D converter unit 36 digitizes the electric signal from the photoelectric converting unit 35 to convert it into a binary signal including a black level signal corresponding to each black portion and a white level signal corresponding to each white portion in the bar code 31. The white level signal represents a high level signal and the black level signal represents a low level signal because the light amount of the reflected light R2 reflected by each white bar is larger than that of the reflected light R2 reflected by each black bar in the binary signal.

Numeral 37 represents a bar width counter for counting clock signals from the clock generator 38. The bar width counter 37 also outputs as a clock signal count value the time widths of the black level signal portion and the white level signal portion of a binary signal from the A/D converter unit 36, or each black bar width and each white bar width of an actual bar code 31.

Furthermore, the memory 39 stores the bar width count value from the bar width counter 37. The CPU 40 extracts and decodes predetermined data of the bar code 31 based on the bar width count value (a value corresponding to each black bar width or each white bar width) stored in the memory 39.

In the above structure, the scanning mechanism 34 irradiates the laser beam L1 emitted from the laser emitting unit 33 as the laser beam L2 to the black bar and the white bar of the bar code 31 while it moves and scans the laser beam at a constant rate and in the direction perpendicular to the black bar and white bar of the bar code 31.

The laser beam L2 emitted from the scanning mechanism 34 is scatteringly reflected on a portion of the bar code 31 and is re-irradiated as the reflected light R1 to the scanning mechanism 34. The reflected light R1 varies its reflection angle as the laser beam L2 scans and moves. However the polygon mirror constituting the scanning mechanism 34 reflects the reflected light R1 to input it as the reflected light R2 to the photoelectric element in the photoelectric converting unit 35 arranged at a predetermined place.

The photoelectric converting unit 35 converts the reflected light R2 to an electric signal corresponding to the amount thereof. The A/D converter unit 36 digitizes the electric signal into a binary signal including a black level signal corresponding to each black level portion and a white level signal corresponding to each white level portion of the bar code 31.

The A/D converter unit 36 produces a digital signal as a binary signal. The bar width counter 37 counts clock signals from the clock generator 38 so that the time width (a value corresponding to the widths of each black bar and each white bar of an actual bar code 31) of the black level signal portion and the white level signal portion of the binary signal from the A/D converter unit 36 is measured as a clock signal count value. The memory 39 stores temporarily the count value. The CPU 40 subjects the bar width count value stored in the memory 39 to a predetermined decoding process to extract and decode the determined data of the bar code 31.

FIG. 13 is a diagram showing a bar code reader which converts an electrical signal (analog signal) corresponding to the amount of the light R2 reflected from the photoelectric converting unit 35 into a binary signal to store in the memory 39.

As shown in FIG. 13, the bar code reader is constituted of the bar code information detection unit 41 in the photoelectric converting unit 35, the A/D converting unit 36, the binary data converting unit 42 having the comprehensive function of the bar width counter 37 and the clock 38, and the FIFO (first-in first-out) memory 43 acting as the memory 39.

In such a structure, the bar code information detecting unit 41 first detects the bright and dark information on the bar width of the bar code 31 as an analog signal. Next the binary data converting unit 42 converts the analog signal into binary data to store sequentially in the FIFO memory 43.

The binary data stored in the FIFO memory 43 includes a large amount of the so-called trash data, or data being not the bar width bright and dark information of the bar code 31. For example, noises due to stains on the paper on which the bar code 31 is printed may be outputted as a bar width detection signal.

However, in the above bar code reading method and the bar code reader, there is a problem that if the bar code information read should include a large amount of trash data, it is difficult to find quickly normal bar code data and the decreased normal bar code storage efficiency degrades the reliability of the bar code reader.

SUMMARY OF THE INVENTION

The present invention is made to overcome the above described problems. An object of the present invention is to provide a bar code reading method which provides an improved bar code reading rate and an improved effective bar code storage efficiency by detecting trash data so as not to store them in a memory.

Another object of the present invention is to provide a bar code reader which provides an improved bar code reading rate and an improved effective bar code storage efficiency by detecting trash data so as not to store them in a memory.

In order to achieve the above object, according to the present invention, the bar code reading method is characterized by the steps of detecting bright and dark information of a bar width based on a bar code; converting the detected bright and dark information into binary information; storing plural pieces of the converted binary information; sequentially outputting the plural pieces of the binary information on a first-in, first-out basis; detecting binary information as error information when plural pieces of bar code bright and dark information do not come alternately in a binary information storing operation; and storing only the last data of plural pieces of binary information detected continuously when plural pieces of error information are continuously detected, and erasing the other information.

A bar code reader of the present invention is characterized by bright and dark information detector for detecting bright and dark information of a bar width based on a bar code; binary information converting means for converting the detected bright and dark information detected by the bright and dark information detector into binary information; binary information storing means for storing plural pieces of binary information converted by the bar width counter and sequentially outputting the plural pieces of binary information on a first-in, first-out basis; error information detecting means for detecting as error information the binary information detected continuously when the plural pieces of bar code bright and dark information do not come alternately in order to store in the binary information storing means; and first control means for controllably storing only the last one of plural pieces of binary information detected continuously in the binary information storing means when the error information detecting means continuously detects the error information.

Moreover according to a bar code reader of the present invention, the first control means erases a previous one of plural pieces of binary information sent continuously when the error information detecting means continuously detects the error information.

According to the present invention, a bar code reading method is characterized by the steps of: detecting bright and dark information of a bar width based on a bar code; converting the detected bright and dark information into binary information; storing plural pieces of the converted binary information; sequentially outputting the plural pieces of binary information in a first-in, first-out basis; counting the size of binary information to be stored; and storing only the last binary information of binary information sent continuously when plural pieces of binary information having at least a predetermined value come continuously, and erasing the remaining information.

According to the present invention, a bar code reader is characterized by bright and dark information detector for detecting bright and dark information of a bar width based on a bar code; bar width counter for converting the detected bright and dark information detected by the bright and dark information detector into binary information; binary information storing means for storing plural pieces of binary information converted by the bar width counter and sequentially outputting the plural pieces of binary information on a first-in, first-out basis; overflow detector for counting the size of binary information to be stored; second control means for controlling so as to store only the last one of the continuously sent binary information in the binary information storing means when plural pieces of binary information counted by the detector come continuously, each of the plural pieces of binary information having a value larger than a predetermined value.

A bar code reader according to the present invention is further characterized by second control means which erases a previous one of the continuously sent binary information when the counting means counts continuously plural pieces of binary information each having a value larger than a predetermined value.

A bar code reading method of the present invention is characterized by the steps of detecting bright and dark information of a bar width based on a bar code; converting the detected bright and dark information into binary information; storing plural pieces of the converted binary information; sequentially outputting the plural pieces of binary information on a first-in, first-out basis; detecting the binary information as error information when the bar code bright and dark information does not come alternately in a binary information storing operation; storing only the last data of plural pieces of binary information sent continuously when the error information are continuously detected, and erasing the remaining information; and storing only the last binary information of plural pieces of binary information sent continuously when plural pieces of binary information to be stored having at least a predetermined value are continuously counted, and erasing the remaining information.

A bar code reader of the present invention is characterized by bright and dark information detector for detecting bright and dark information of a bar width based on a bar code; bar width counter for converting the detected bright and dark information detected by said bright and dark information detector into binary information; binary information storing means for storing plural pieces of binary information converted by said bar width counter and sequentially outputting the plural pieces of binary information on a first-in, first-out basis; error information detecting means for detecting as error information the binary information sent continuously when plural pieces of bar code bright and dark information do not come alternately in order to store in the binary information storing means; overflow detector the size of binary information to be stored; and third control means for controllably storing only the last one of the plural pieces of binary information sent continuously in the binary information storing means when the error information detecting means continuously detects the error information, and for controllably storing only the last one of the plural pieces of binary information sent continuously in the binary information storing means when the overflow detector continuously counts binary information having a value larger than a predetermined value.

According to a bar code reader of the present invention, the third control means erases a previous one of plural pieces of binary information sent continuously when the error information detecting means continuously detects the error information and erases a previous one of plural pieces of binary information sent continuously when the overflow detector continuously counts plural pieces of binary information each having a value larger than a predetermined value.

Therefore, the bar code reading method and the bar code reader of the present invention provide the following functions and advantages:

(1) Since noises in the bar code are erased in the bar code reading area, the bar code reading rate and the effective bar code data storage efficiency can be improved.

(2) Since noises which are included in an analog signal as bright and dark information on a detected bar width are erased outside the bar code reading area, the bar code reading rate and the effective bar code data storage efficiency can be improved.

(3) Since noises produced within and outside the bar code reading area are comprehensively erased, an improved bar code reading rate and an improved bar code data storage efficiency can be obtained. As a result, the reduced amount of memory occupation leads to a reduced memory manufacturing cost.

DESCRIPTION OF THE PREFERRED EMBODIMENTS

Referring to the attached drawings, explanation will be made in detail as for preferred embodiments of both the bar code reader and the bar code reading method according to the present invention.

(a) The Aspect of the Invention

Figure 1:
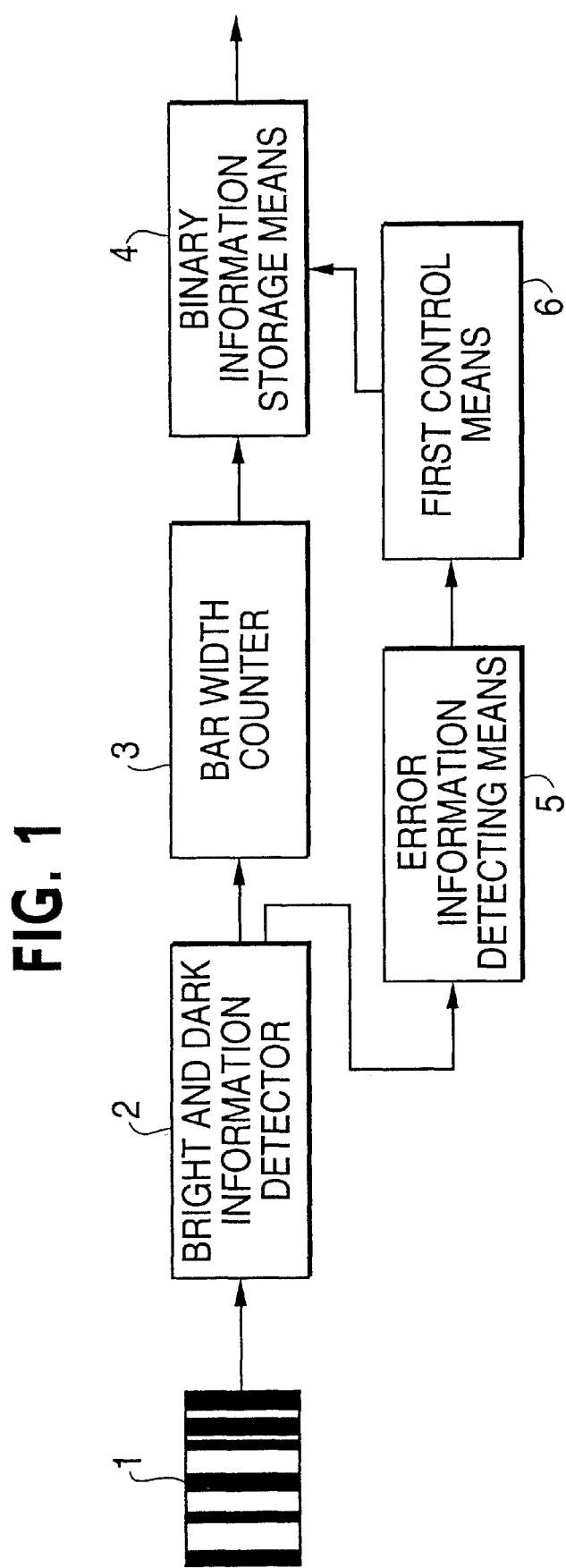
FIG. 1 is a block diagram showing an aspect of the present invention.

FIG. 1 is a block diagram showing an aspect of the present invention. Referring to FIG. 1, the bright and dark information detector 2 detects the bright and dark information of a bar width based on a bar code 1.

The bar width counter 3 converts the bright and dark information detected by the bright and dark information detector 2 into binary information. The binary information storing means 4 stores plural pieces of binary information converted by the binary information converting means 3 and then takes sequentially out of the first-in information among plural pieces of stored information.

When the binary information storing means 4 stores the binary information, the error information detecting means 5 detects as error information the binary information outputted continuously in which the bright and dark information of a bar code do not come alternately.

When the error information detecting means 5 detects continuous the error information, the first control means 6 controls so as to store only the last one among the continuous binary information into the binary information storing means 4.

Moreover, when the error information detecting means 5 detects continuous the error information, the first control means 6 erases the previous one among plural pieces of binary information detected continuously.

In the bar code reading method and the bar code reader according to the present invention shown in FIG. 1, the bright and dark information detecting means 2 detects the bright and dark information of a bar width based on the bar code 1. The bright and dark information is converted into a, binary information by the bar width counter 3. The binary information storing means 4 stores plural pieces of converted binary information and outputs the stored binary information sequentially from the first-in information.

In order to store the binary information, the error information detecting means 5 detects as error information the continuously sent binary information representing continuously white or continuously black information and the first control means 6 controls so as to store only the last data among the continuous binary information when the error data are detected continuously and so as to erase the remaining data.

Figure 2:
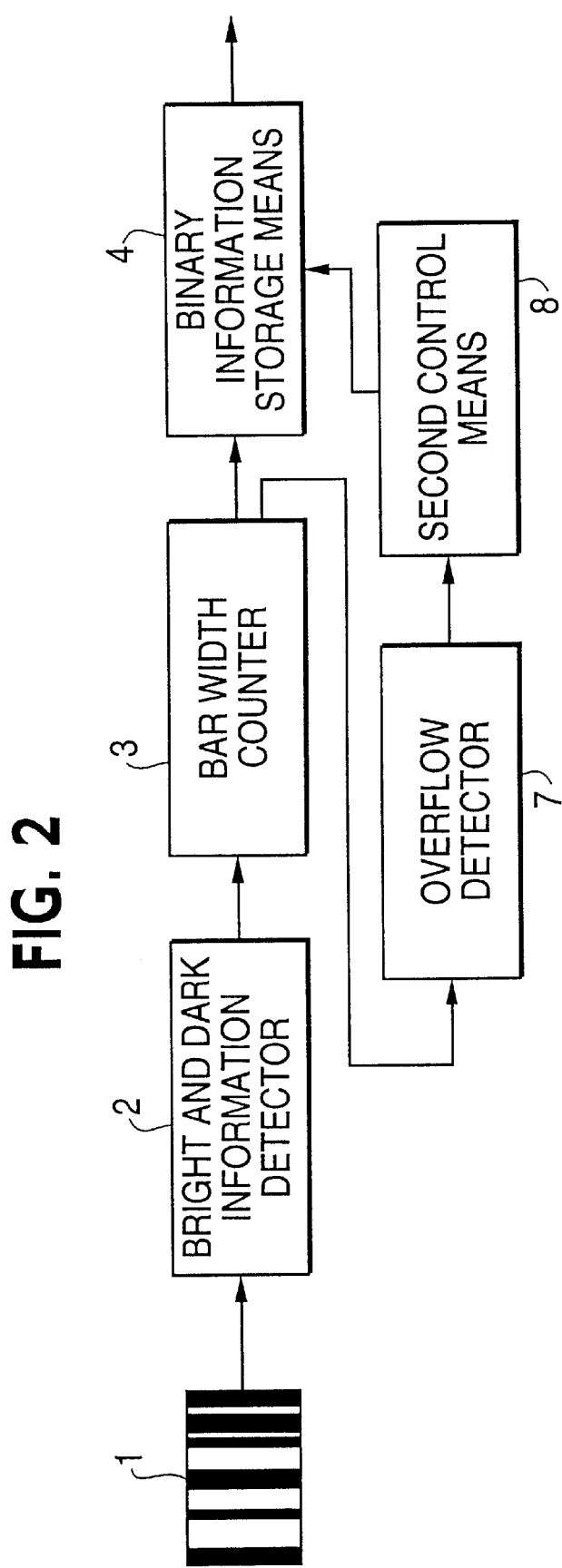
FIG. 2 is a block diagram showing an aspect of the present invention.

FIG. 2 is a block diagram showing the aspect of the present invention. Referring to FIG. 2, the bar code 1, the bright and dark information detecting means 2, the binary information converting means 3, and the binary information storing means 4 correspond functionally to those shown in FIG. 1. Hence a detail explanation will be omitted.

The overflow detector 7 checks the size of the binary information to be stored. The second control means 8 controls the binary information storing means 4 to store only the last one among a series of information counted by the overflow detector 7, the binary information having a predetermined value or more.

Moreover, when the overflow detector 7 checks the binary information having a predetermined value or more, the second control means 8 erases the previous one among the series of binary information.

In both the bar code reading method and the bar code reader according to the present invention shown in FIG. 2, the bright and dark information detector 2 detects the bright and dark information of a bar width based on the bar code 1. The bar width counter 3 converts the detected bright and dark information into binary information. The binary information storing means 4 stores plural pieces of the converted bright and dark information and then outputs sequentially the binary information on a first-in, first-out basis.

The overflow detector 7 checks the size of the binary information to be stored. The second control means 8 controls so as to store only the last binary information among plural pieces of information sent continuously when binary information having a predetermined value and more comes, and erases the other information.

Figure 3:
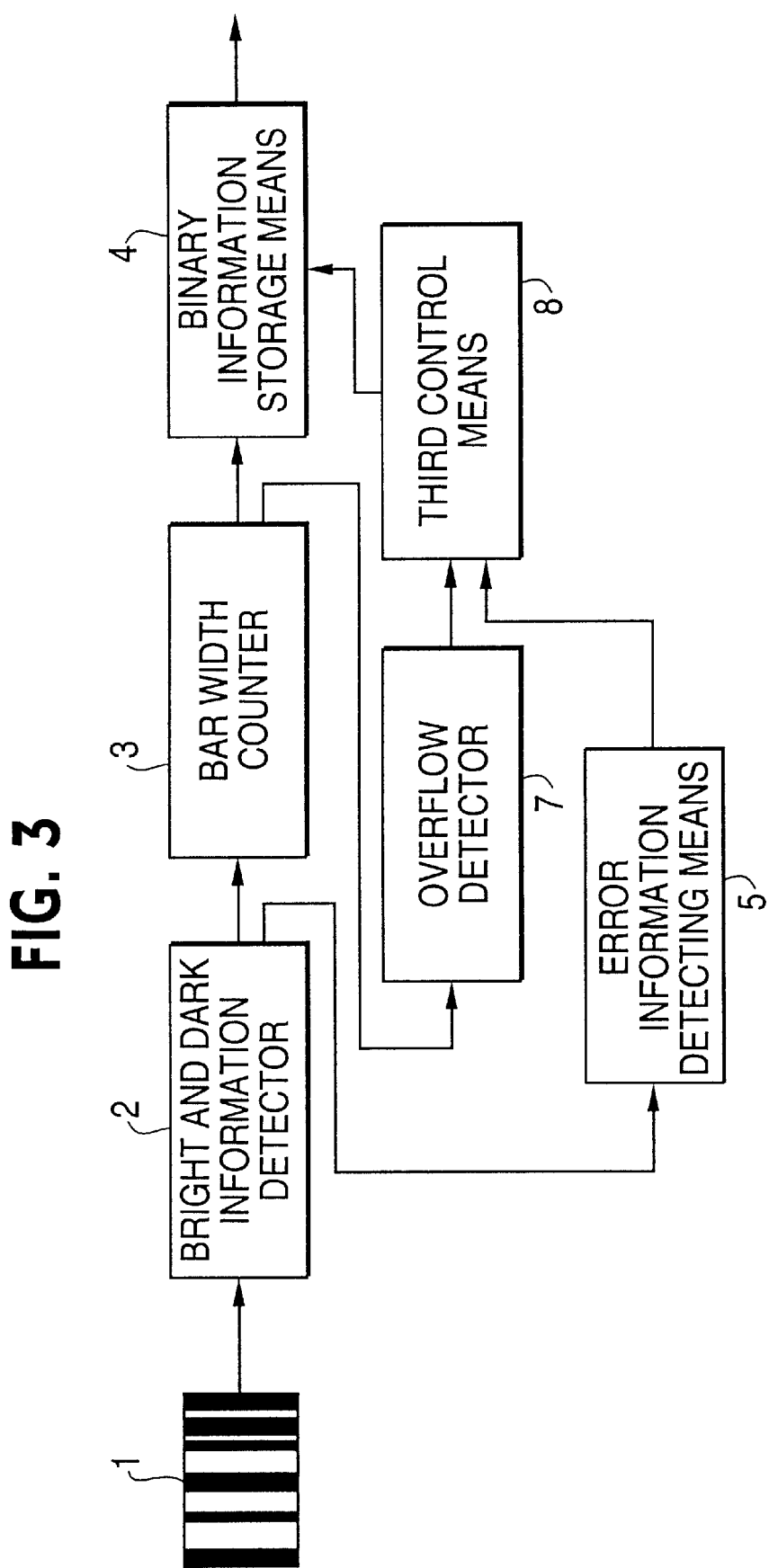
FIG. 3 is a block diagram showing an aspect of the present invention.

Moreover, FIG. 3 is a block diagram showing the aspect of the present invention. Referring to FIG. 3, the bar code 1, the bright and dark information detector 2, the bar width counter 3, and the binary information storing means 4 correspond functionally to those in FIGS. 1 and 2, respectively. Hence, a detail explanation for the above configuration will be omitted.

In order to store information into the binary information storing means 4, when the bright and dark information on the bar code does not appear alternately, the error information detecting means 5 detects as an error information the continuously coming binary information to output it to the third control means 9.

The overflow detector 7 inputs binary information converted by the bar width counter 3 check the size of the binary information to be stored. The result is outputted to the third control means 9.

When the error information detecting means 5 detects continuously error information, the third control means 9 controls so as to store only the last one among a series of binary information into the binary information storing means 4. The third control means 9 also controls so as to store only last one among a series of binary information into the binary information storing means 4 when the overflow detector 7 checks binary information having a predetermined value and more.

Moreover, the third control means 9 controls so as to erase the previous one among a series of binary information when the error information detecting means 5 detects continuously error information, and so as to erase the previous one among a series of information when the overflow detector 7 checks continuous binary information having a predetermined value and more.

In the bar code reading method and the bar code reader according to the present invention shown in FIG. 3, the bright and dark information detecting means 2 detects the bar width bright and dark information of a bar code. The bar width counter 3 converts the detected bright and dark information into binary information. The binary information converting means 4 stores plural pieces of converted binary information, and outputs sequentially the binary information on a first-in, first-out basis.

On the other end, in the binary information storing process, the error information detecting means 5 detects as error information a series of binary information when the bright and dark information of a bar code do not alternately appear. The overflow detector 7 checks the value of binary information to be stored.

The third control means 9 stores only the last data among a series of binary information when the error information detecting means 5 detects continuously the error information, and erases the other information. The third control means 9 also stores only the last binary information among the series of the binary information when the overflow detector 7 checks continuous binary information with a predetermined value and more, and erases the remaining binary information.

Therefore, according to both the bar code reading method and the bar code reader of the present invention, there are the following advantages and effects:

(1) Since noises in the bar code are erased in the bar code reading area, the bar code reading rate and the effective bar code data storage efficiency can be improved.

(2) Since noises included in an analog signal as bar width bright and dark information detected are erased outside the bar code reading area, the bar code reading rate and the effective bar code data storage efficiency can be improved.

(3) Since noises produced within and outside the bar code reading area are comprehensively erased, an improved bar code reading rate and an improved bar code data storage efficiency can be obtained. As a result, the reduced amount of memory occupation capacity leads to a reduced memory manufacturing cost.

(b) Explanation of First Embodiment

An embodiment of the present invention will be described below with reference to the attached drawings.

Figure 4:
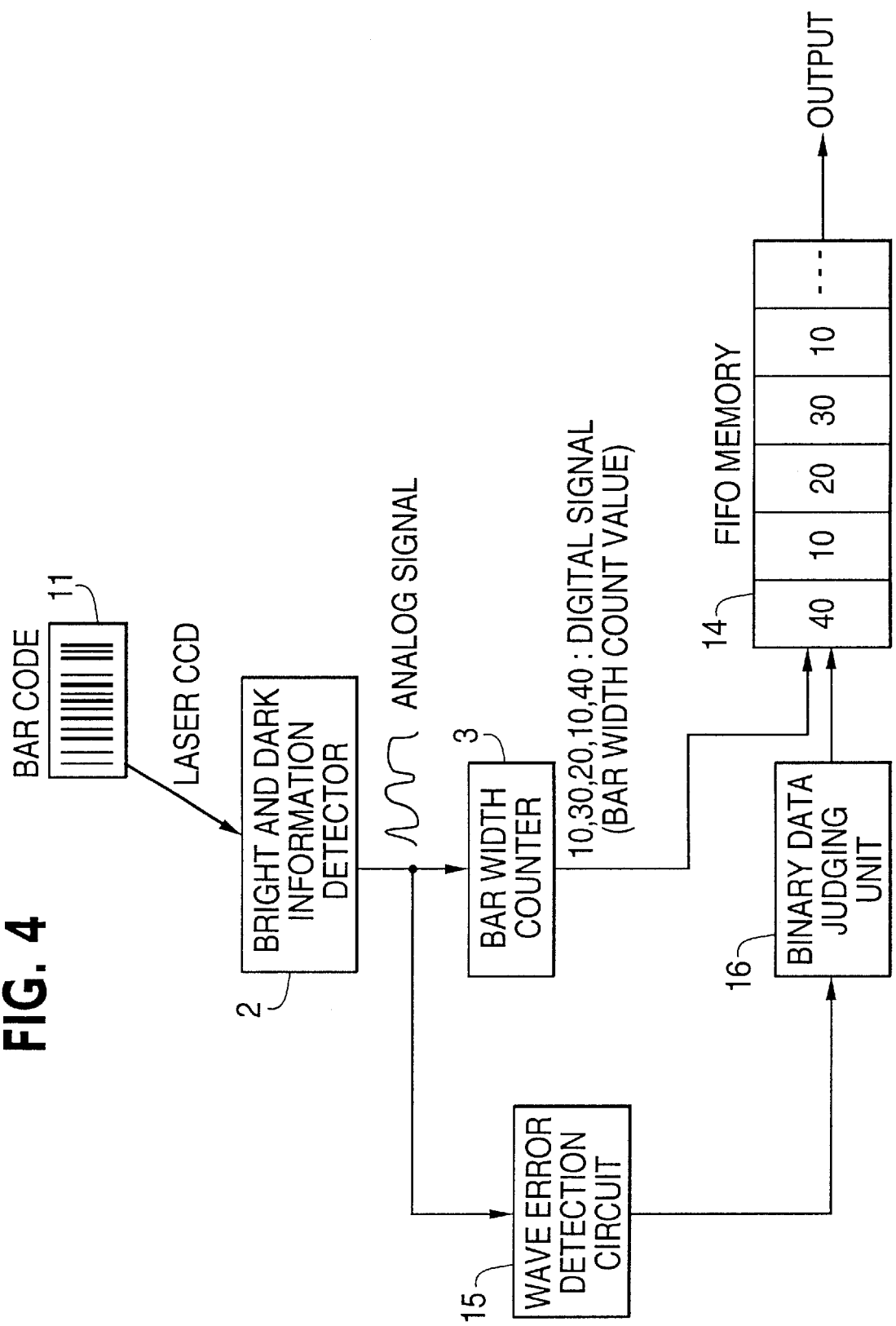
FIG. 4 is a diagram showing a first embodiment according to the present invention.
Figure 12:
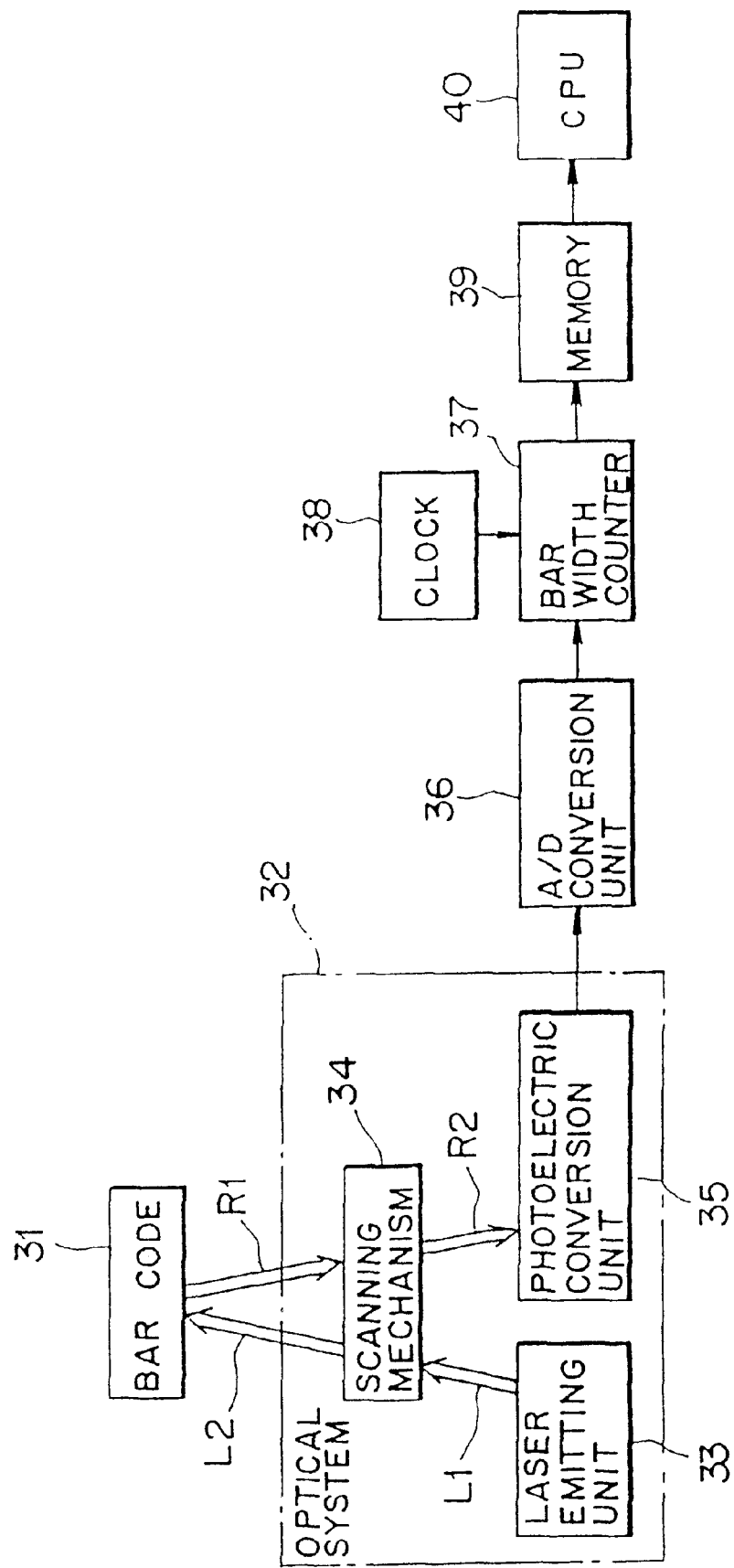
FIG. 12 is a block diagram showing a configuration of a bar code reader.
Figure 13:
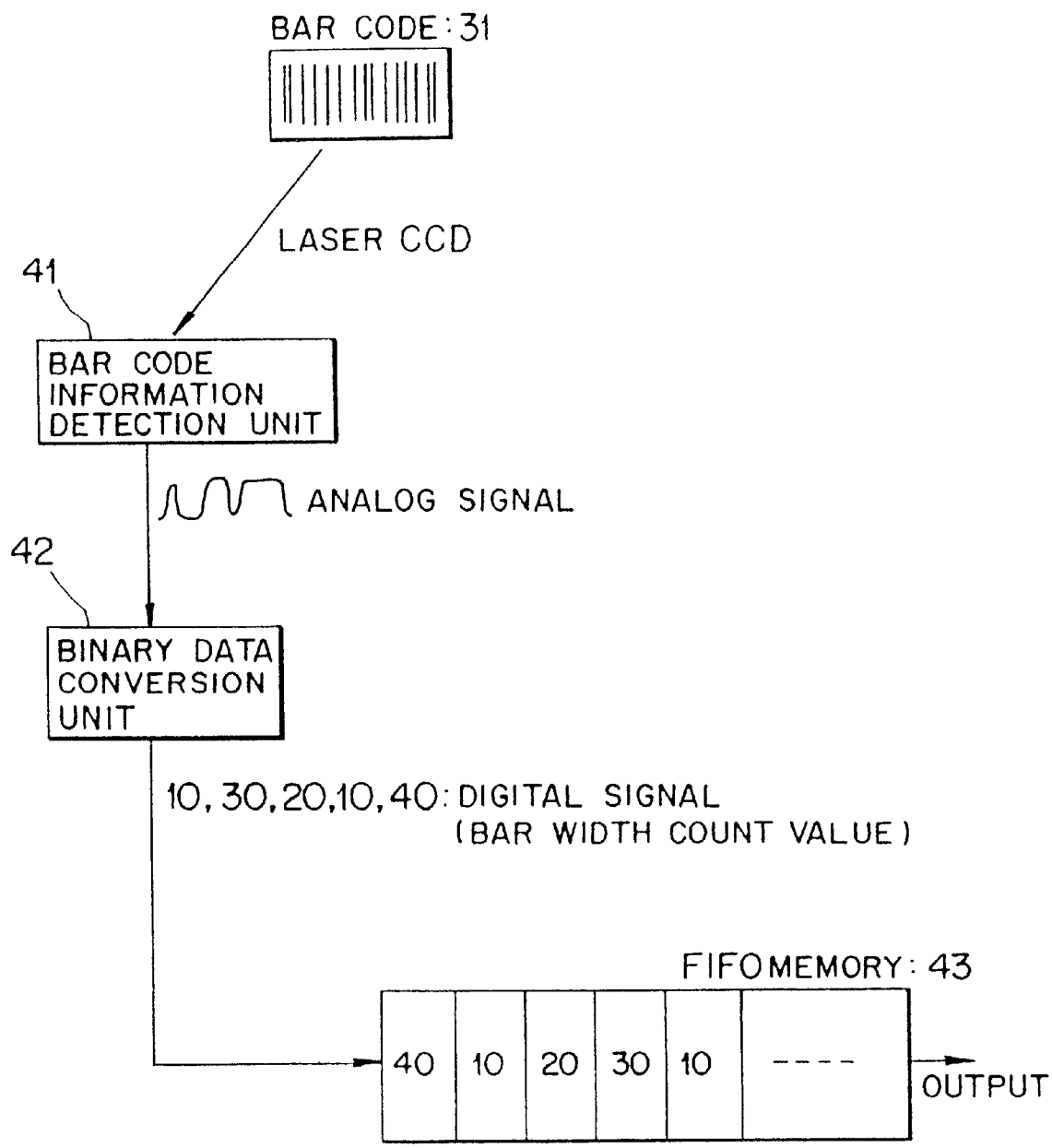
FIG. 13 is a block diagram showing a bar code reader.

FIG. 4 is a block diagram showing the first embodiment of the present invention. In FIG. 4, the bright and dark information detector 2 detects the bright and dark information on the bar width of the bar code 11. The bright and dark information detecting unit 12 functions as the photoelectric conversion unit 35 shown in FIG. 12.

For example, the bright and dark information detector 2 receives the laser beam reflected on the bar code 11 using a CCD to output it as an analog signal.

The bright and dark information detector 2 outputs as detection signals analog signals corresponding to each black bar portion and each white bar portion of the bar code 11 which are respectively a high level signal and a low level signal.

The bar width counter subjects an analog signal inputted to the bright and dark information detecting unit 12 to produce information corresponding to each black bar portion and each white bar portion of the bar code 31 by performing an A/D conversion. The bar width counter 3 has the functions similar to those of the A/D converting unit 36, the bar width counter 37, and the clock 38, shown in FIG. 12.

That is, the analog signal is differentiated and delayed. The transition in level from a low level signal to a high level signal is detected as an edge signal or a pulse signal. The span between the edge signals is counted to produce a signal indicating each black bar portion and a signal indicating each white bar portion.

The FIFO memory (binary information storing means) 14 stores data converted by the bar width counter 3 bar width count values, and outputs them sequentially on a first-in, first-out basis. The FIFO memory 14 functions as the memory 39 shown in FIG. 12.

When the FIFO memory 14 stores bar width information, the wave error detection circuit (error information detecting means) 15 detects as a wave error a series of plural pieces of bar width information which do not come alternately.

Figure 7:
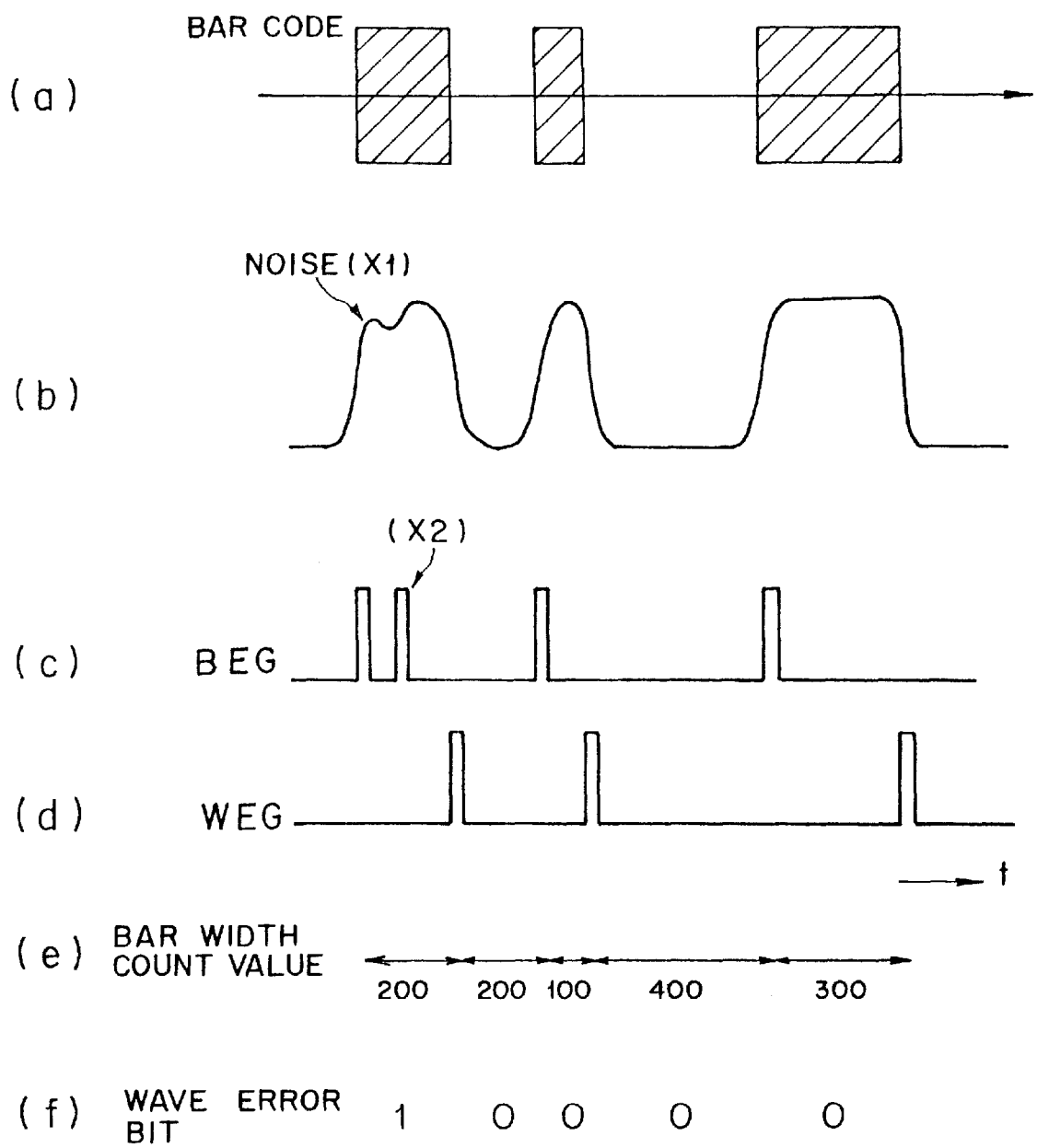
FIGS. 7(a) to 7(f) are diagrams each used for explaining an operation of a first embodiment of the present invention.

In concrete, in the bar code 11 shown in FIG. 7(a), the bright and dark information detector 2 outputs an analog signal shown in FIG. 7(b) to the wave error detection circuit 15. The black edge signal and the white edge signal each of which is detected after being subjected to a differentiating process and a delaying process are shown in FIGS. 7(c) and 7(d), respectively.

The wave error is defined as a phenomenon that when the analog signal shown in FIG. 7(b) includes noise components shown as the point (X1), it is detected as an edge signal shown as the point (X2) in FIG. 7(c) but the black edge signal and the white edge signal are not alternately outputted.

When the wave error detection circuit 15 detects a wave error, a high level signal as an error bit is outputted to the binary data judging unit 16 (to be described later).

When the wave error detection circuit 15 detects continuously high level signals as error bits, the binary data judging unit (first control means) 16 stores the last one among the bar width count value information corresponding to a chain of error bits into the FIFO memory 14 and erases the previous bit.

Figure 5:
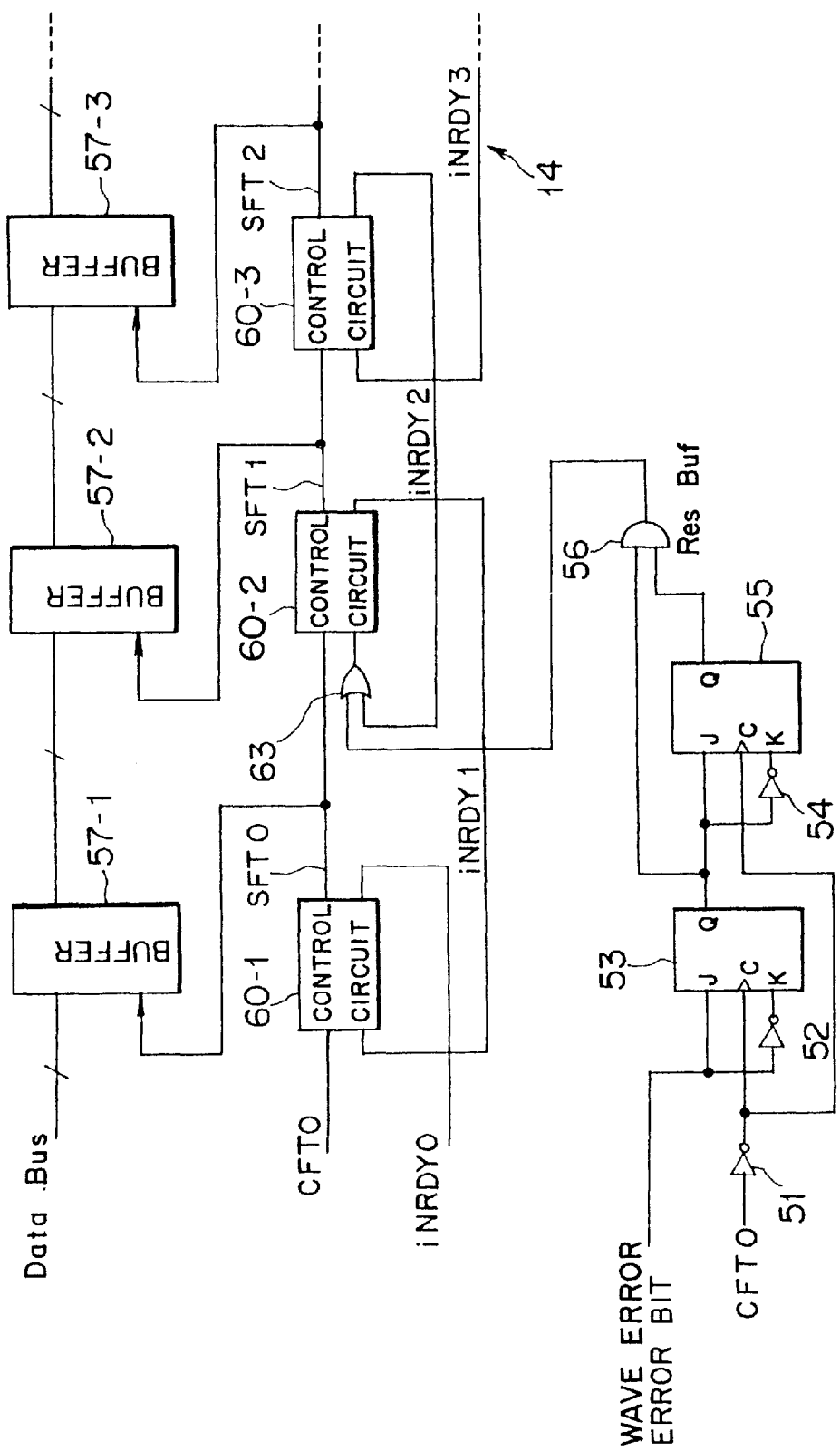
FIG. 5 is a diagram showing the main portion of a first embodiment of the present invention.

The binary data judging unit 16 and the FIFO memory 14 have the configurations shown in FIG. 5, respectively.

That is, the FIFO memory 14 is formed of plural buffers 57-1, 57-2, 57-3, . . . , control circuits 60-i each connected to each of the buffers 57-i (i=1, 2, 3, . . . ), the OR logic circuit 63. The binary data judging unit 16 is formed of the NOT circuits 51, 52, and 54, the JK flip-flops 53 and 55, and the AND logic circuit 56.

The buffers 57-i in the FIFO memory 14 are interconnected in a multistage. Each of the buffers 57-i stores (latches) binary data one by one when the control signals SFT0, SFT1, SFT2, . . . from the control circuit 60-i are at high levels.

Moreover, the control circuits 60-i are connected in a multistage and are connected to corresponding buffers 57-i, respectively. The control circuits 60-i are shown in detail in FIG. 6.

Figure 6:
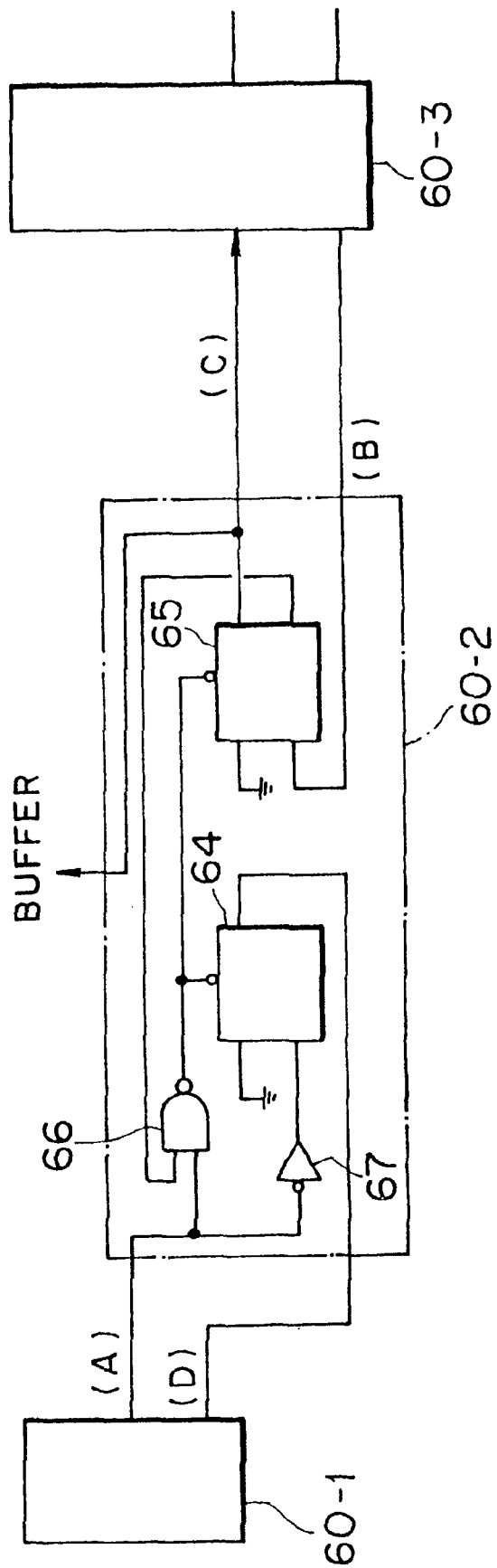
FIG. 6 is a diagram showing the main portion of a first embodiment of the present invention.

As shown in FIG. 6, the control circuit 60-2, for example, is constituted of the flip-flops 64 and 65, the NAND logic circuit 66, and the NOT circuit 67. This configuration is applicable for the other control circuits 60-1, 60-3, . . . .

For example, when data stored in the buffer 57-2 are emptied, the flip-flop 64 in the control circuit 60-2 outputs a shutout signal D (a high level signal) to the control circuit 60-1 and soon receives new binary data from the buffer 57-1.

The shift-out signal D at a low level is a signal (INRDY signal) that does not shift data from the next stage's buffer.

The output ready signal A inputted from the control circuit 60-1 to the flip-flop G3 indicates whether the binary data has shifted from the buffer 57-1 to the buffer 57-2.

The flip-flop 65 is requested to output data stored in the buffer 57-2 to the buffer 57-3 when it receives data output command signal B from the control circuit 60-3. The buffer 57-2 the binary data stored therein the binary data stored in the buffer 57-2 to the buffer 57-3 to is erased in response to tile data ready signal C from the control circuit 60-2.

The buffer control circuit in the previous state detects whether the buffer in the following stage has latched the data. If the buffer in the following stage has not latched the data, the FIFO memory 14 shifts data to the next stage. If the buffer in the following stage has latched data, the FIFO memory 14 ensures its state without shifting the data.

The other control circuits operate in the same manner as the above configuration.

In the binary data judging unit 16 shown in FIG. 5, the flip-flops 53 and 54 input error bits from the wave error detection circuit 15. However, when the wave errors occur continuously, a control signal is outputted via the AND logic circuit 56 to erase the binary data stored in the buffer 57-2.

That is, when wave errors occur continuously, the AND logic circuit 56 inputs high level signals from the flip-flops 53 and 54 and outputs a high level signal to the OR logic circuit 63 in the FIFO memory 14. Hence, when the control circuit 60-3 inputs the data output signal B while the buffer 57-2 inputs the data ready signal C, the binary data stored in the buffer 57-2 is erased.

The binary data corresponding to the series of error bits are stored in the buffers 57-1 and 57-2. Of the two pieces of binary data, the previous data stored in the buffer 57-2 are erased and only the last data is stored.

The bar code reader with the above configuration according to the first embodiment of the present invention operates as follows:

That is, in the bar code 11, for example, shown in FIG. 7(a), the bright and dark information detector 2 converts the bar code signal into the analog signal shown in FIG. 7(b). The analog signal is inputted to the wave error detection circuit 15.

The bar width counter 3 subjects the analog signal to a differentiating process and a delaying process and produces a black edge signal shown in FIG. 7(c) and a white edge signal shown in FIG. 7(d). Moreover, an internal counter counts the span between alternating edge signals in accordance with internal clocks so that the bar width count value information is produced as shown in FIG. 7(e).

When the analog signal outputted from the bright and dark information detecting unit 12, for example, includes noises shown with the point (X1) in FIG. 7(a), the edge signal shown with the point (X2) in FIG. 7(c) may rise up.

The wave error detection circuit 15 detects the noises as a wave error and outputs a high level signal as an error bit shown in FIG. 7(f).

Next, explanation will be made below as for the 5 operations of the FIFO memory 14 and the binary data judging unit 16 when the wave error detection circuit 15 outputs continuously error bits, with reference to FIG. 8.

Figure 8:
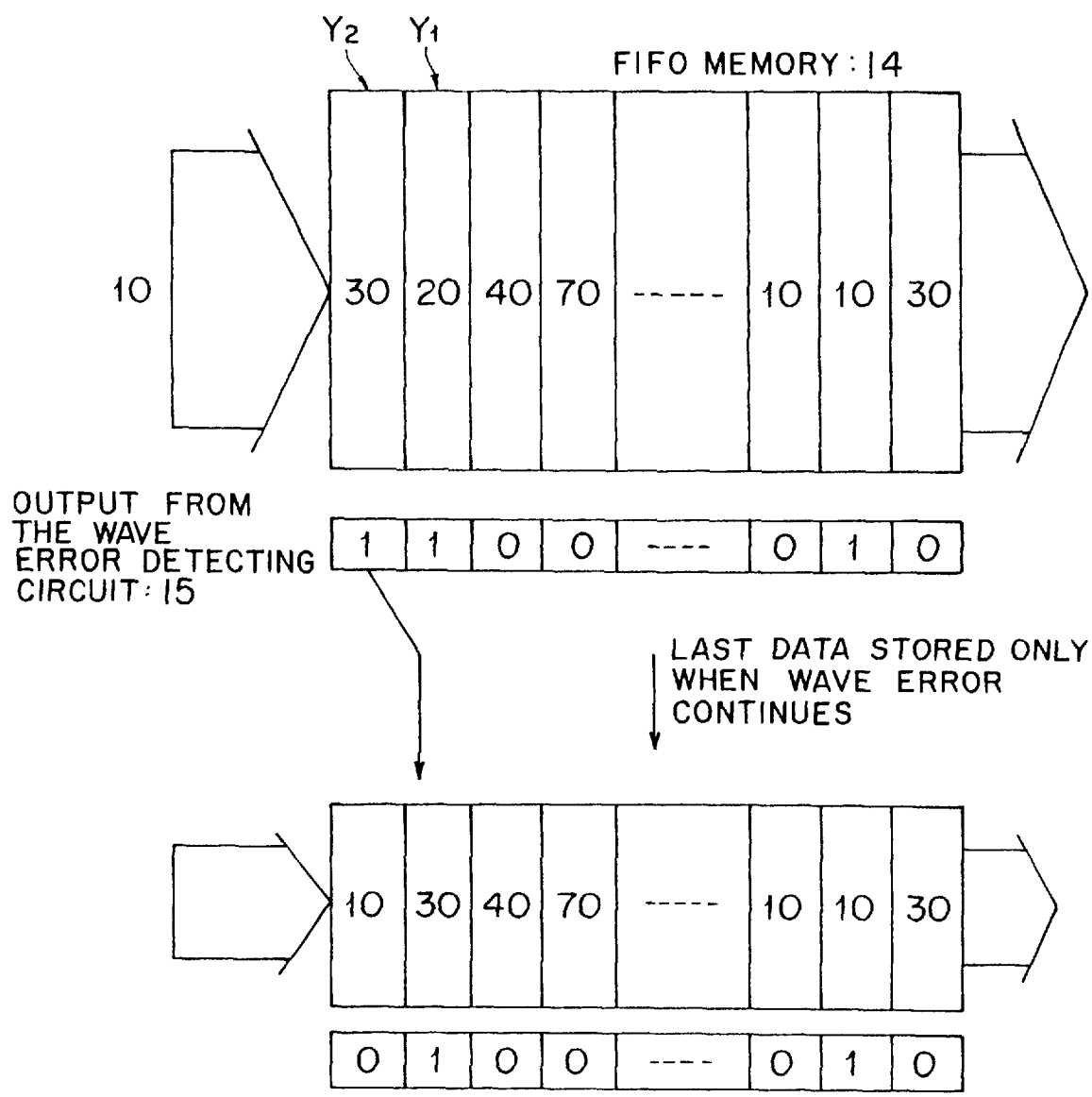
FIG. 8 is a diagram used for explaining an operation of a first embodiment of the present invention.

That is, as shown in FIG. 8, the FIFO memory 14, for example, inputs binary data having bar width count values of "30", "10", "10", . . . , "70", "40", "20", and "30". Of them, error bits occur at the bar width count value (Y1) of "20" and the bar width count value (Y2) of "30", as shown in FIG. 8.

In this case, the binary data Y2 inputted previously is erased while the binary data Y1 is shifted. Then the FIFO memory 14 stores the bar width count value of "10" following the binary data Y2 in response to a control signal from the binary data judging unit 16.

Thus, before the binary data including continuous error bits are erased, the binary data having bar width count values of "30", "10", "10", . . . , "70", "40", "20", and "30" are inputted. However, after the binary data of "20" including continuous error bits have been erased, the binary data having bar width count values "30", "10", "10", . . . , "70", "40", "30", and "10" are inputted at the same position.

As described above, according to the first embodiment of the present invention, when the FIFO memory 14 stores the bar width information, the wave error detection circuit 15 detects as wave error information the bar width information corresponding to a chain of plural pieces of the continuously black edges or continuously white edges. When the binary data judging unit 16 detects continuously the wave error, the FIFO memory 14 stores only tile last one of the bar width count value information corresponding to the wave error, and the previous information is erased. Particularly, there is an advantage in that since noises due to the bar code can be erased in the bar code reading area, the bar code reading rate can be improved and the effective bar code data storing efficiency can be improved.

(c) Explanation of Second Embodiment

Next the second embodiment according to the present invention will be described below.

Figure 9:
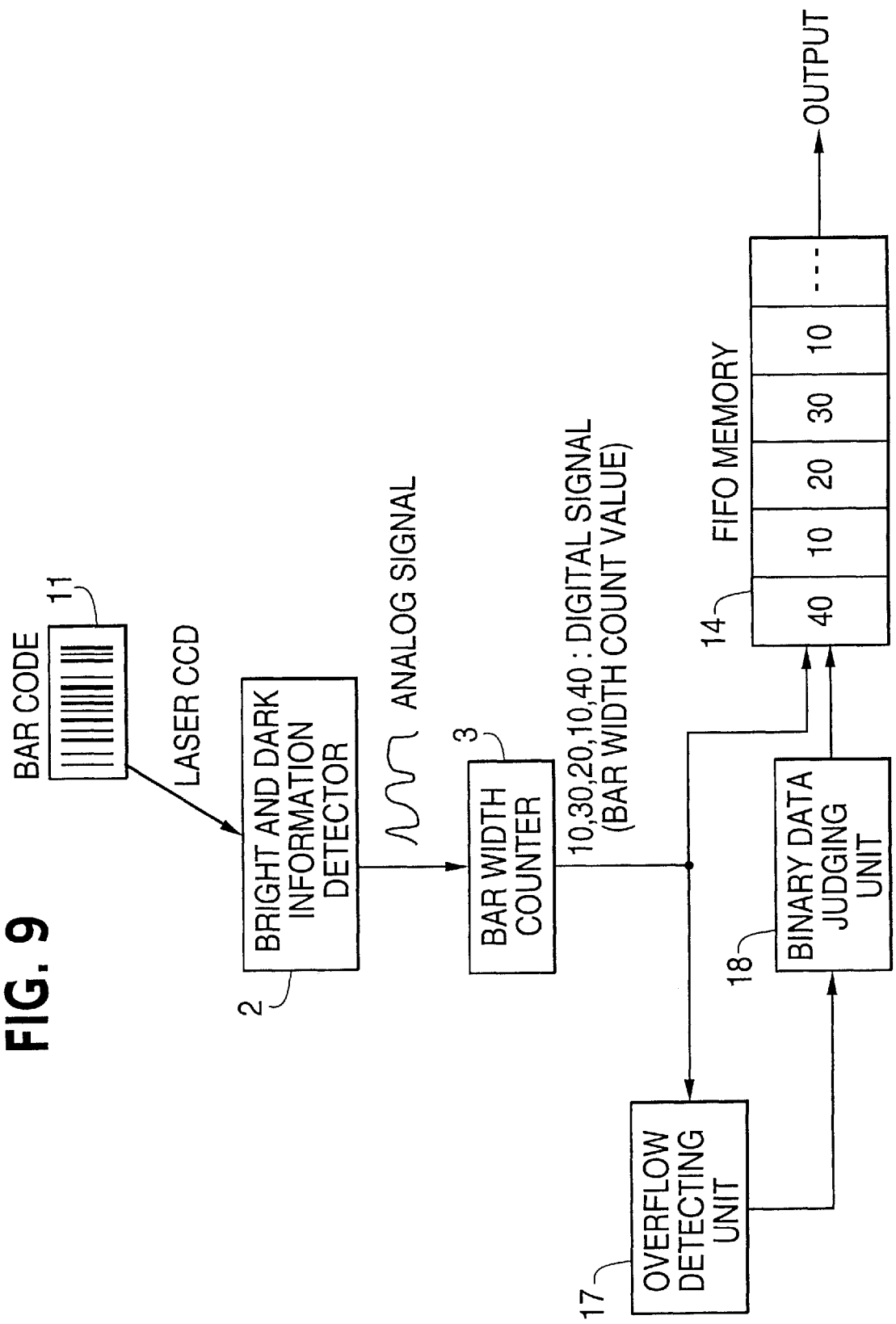
FIG. 9 is a diagram showing a second embodiment according to the present invention.

FIG. 9 is a block diagram showing the second embodiment of the present invention. The bar code reader shown in FIG. 9 is different from the first embodiment shown in FIG. 4 in that both the overflow detecting unit (mean) 17 and the overflow judging unit (second control means) 18 are arranged instead of the wave error detection circuit 15 and the binary data judging unit 16. The second embodiment includes the bright and dark information detector 2, the bar width the counter 3, and the FIFO memory 14, shown in the first embodiment.

That is, the overflow detecting unit 17 checks the size of binary information to be stored ill the FIFO memory 14. When the binary information has a predetermined value or more, the overflow value notifying as an error bit is outputted to the overflow judging unit 18.

The overflow judging unit 18 receives information regarding the size of binary information from the overflow detecting unit 17. If the binary information having a predetermined value or more are continuously inputted, the FIFO memory 14 stores only the last one among a series of the binary information and the other information are erased.

Noises which are included in an analog signal from the bright and dark information detector 2 are not stored as bar code reading information into the FIFO memory 14 to the area outside the bar code reading area.

In detail, the overflow judging unit 18 and the FIFO memory 14 correspond functionally to the binary data judging unit 16 and the FIFO memory 14 according to the first embodiment shown in FIGS. 5 and 6, respectively.

The bar code reader according to the second embodiment of the present invention operates as follows:

That is, the bright and dark information detecting unit 12 converts the bar code signal into an analog signal in the same manner as that in the first embodiment. The bar width counter 3 produces a black edge signal and a white edge signal in the same manner as that in the first embodiment in response to an analog signal from the bright and dark information detector 2, thus producing bar width count value information by using the edge signals.

The overflow detecting unit 17 checks the size of binary information to be stored into the FIFO memory 14, using the bar width count value information from the bar width counter 3. When the count value is more than the predetermined value, it is judged that the binary information has an overflow value so that an error bit is outputted.

Moreover, when the overflow detecting unit 17 detects continuous binary information with a predetermined value or more, the overflow judging unit 18 controls the FIFO memory 14 to store only the last binary information among a series of the information and to erase the other information.

According to the second embodiment of the present invention, noises (particularly, occurring from the front and back portions of a bar code) which are included in an analog signal from the bright and dark information detecting unit 12 can be removed in an area outside the bar code reading area. Hence there is an advantage in that the bar code reading rate can be improved and the effective bar code data storage efficiency can be improved.

(d) Explanation of Third Embodiment

Figure 10:
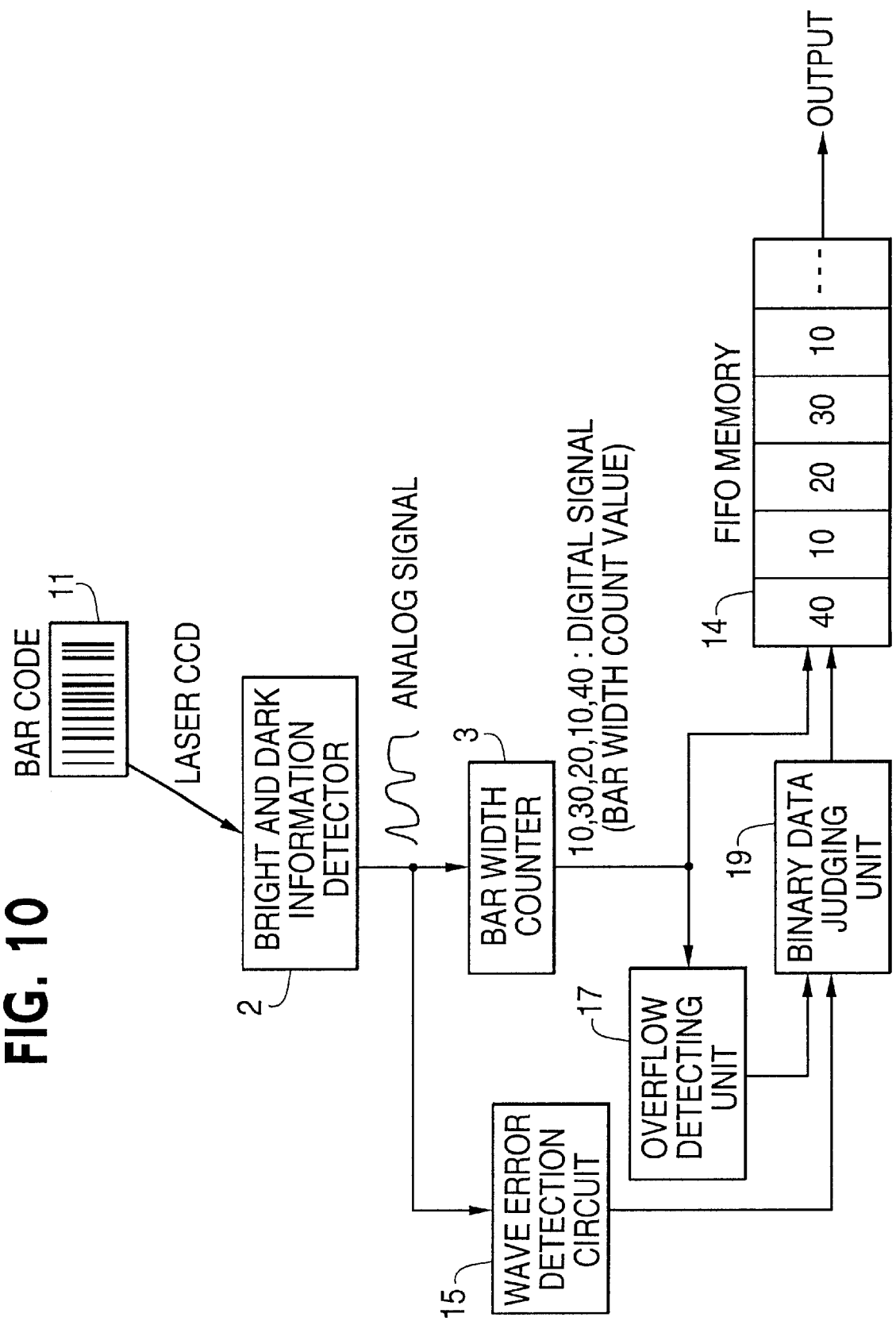
FIG. 10 is a diagram showing a third embodiment according to the present invention.

FIG. 10 is a block diagram showing the third embodiment of the present invention. The bar code reader shown in FIG. 10 differs from the first embodiment in FIG. 4 and the second embodiment in FIG. 9 in that the wave error detection circuit 15 and the overflow detecting unit 17 are simultaneously used and the binary data judging unit 19 is arranged to function as the binary data judging unit 16 and the overflow judging unit 18. The other elements including the bright and dark information detector 2, the bar width counter 3, and the FIFO memory 14 are similar to those in the first and second embodiments.

That is, the above structure according to the present invention includes the wave error detection circuit 15 having the same function as that in the embodiment 1 and the overflow detecting unit 17 having the same function as that in the embodiment 2.

When the wave error detection circuit 15 detects continuously high level signals as error signals, the binary data judging unit 19 controls the FIFO memory 14 to store only the last one among plural pieces of bar width count value information corresponding to the continuous error bits and to erase the previous one thereof. When the binary data judging unit 19 receives plural pieces of binary information with a predetermined value and more continuously outputted from the overflow detecting unit 17, each of the plural pieces of binary information regarding the size of the binary information, it controls the FIFO memory 14 to store only the last binary information but to erase the other information.

Figure 11:
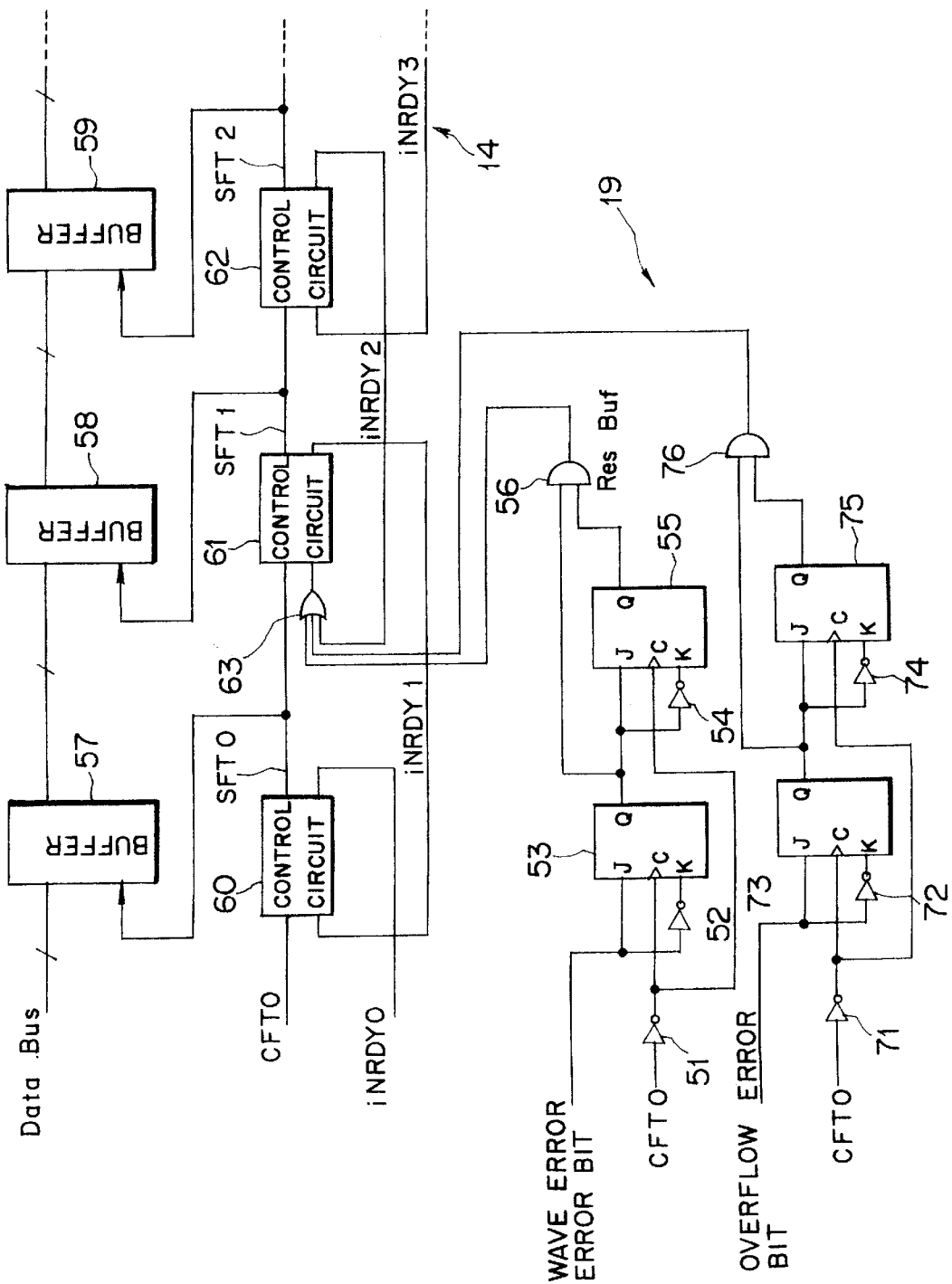
FIG. 11 is a diagram showing the main portion of a third embodiment of the present invention.

The FIFO memory 14 has the corresponding circuit configuration shown in FIG. 11. The binary data judging unit 19 has the corresponding circuit configuration shown in FIG. 11.

Namely, referring to FIG. 11, the FIFO memory 14 is formed of the buffers 57-i, the control circuit 60-i arranged to each of the buffers 57-i, and the OR logic circuit 63, shown in FIG. 5.

The binary data judging unit 19 is constituted of NOT circuits 51, 52, 54, 71, 72, and 74, JK flip-flops 53, 55, 73, and 75, and AND circuits 56 and 76.

The NOT circuits 71, 72, and 74, the JK flip-flops 73 and 75, and the AND circuit 76 receive information regarding the size of binary information from the overflow detecting unit 17. When plural pieces of binary information with a predetermined value (an overflow value) and more are continuously received, the FIFO memory 14 stores only the last one among them and the other information are erased.

That is, the flip-flops 73 and 75 input an error bit from the overflow detecting unit 17. When plural pieces of binary information having an overflow value and more are inputted continuously, the flip-flops output a control signal to erase the binary data stored in the buffer 58 via the AND circuit 76.

With binary information having the overflow value and more inputted continuously, when the AND logic circuit 76 receives high level signals front the flip-flops 73 and 75, it outputs a high level signal to the OR logic circuit 63 in the FIFO memory 14. Therefore the control circuit 61 inputs the data output signal B and outputs the data ready signal C to the buffer 58, so that the binary data stored in the buffer 58 is erased.

The binary data corresponding to a chain of error bits are stored in the buffers 57 and 58. Of the two binary data, the data stored previously to the buffer 58 is erased and only the last one is stored.

The NOT circuits 51, 52, and 54, the JK flip-flops 53 and 55, the AND circuit 56 have the same functions as those in the first embodiment. When error bits each indicating a wave error are continuously inputted, a control signal (Res Buffer) is outputted to the OR logic circuit 63 in the FIFO memory 14 to erase the binary data stored in the buffer 58.

The bar code reading device according to the third embodiment of the present invention operates as follows:

Like the first and second embodiments, the bright and dark information detector 2 converts the bar code signal into an analog signal. Like tile first embodiment, the bar width counter 3 produces a black edge signal and a white edge signal in response to the analog signal from the bright and dark information detector 2. Then the bar width count value information is produced using the edge signal.

Like the first embodiment, in order to store bar width information to the FIFO memory 14, the wave error detection circuit 15 detects as a wave error when a series of bar width information does not include alternately tile bright and dark information of the bar code 11, thus outputting the error bit to the binary data judging unit 19.

The overflow detecting unit 17 counits the size of binary information to be stored to the FIFO memory 14 using the bar width count value information from the bar width counter 3 converting unit 13. When binary information, has a predetermined value and more or is binary information of an overflow value, it outputs an error bit to the binary data judging unit 19

Furthermore, in response to an error bit from the wave error detection circuit 15, the binary data judging unit 19 outputs a control signal to erase the binary data stored in the buffer 58 via the AND logic circuit 56 when wave errors are continuously received. The binary data judging unit 19 also outputs a control signal for erasing data stored in the buffer 58 when the counting unit 17 counts continuously the binary information having a predetermined value and more.

Then when data stored in the buffer 58 in the FIFO memory 14 is erased, the data stored in the buffer 57 is shifted to the buffer 58.

According to the third embodiment of the present invention, a bar code reading device includes the bright and dark information detecting unit 12, the binary data converting unit 13, the FIFO memory 14, and the binary data judging unit 19 acting as the wave error detection circuit 15 and the counting unit 17. Noises which occur within and outside the bar code reading area can be erased. Since the bar code reading rate as well as the bar code data storage efficiency can be improved, the memory occupation capacity can be advantageously reduced, thus realizing a reduced memory manufacturing cost.

What is claimed is:

1. A bar code reading method comprising the steps of:
   detecting bright and dark information of a bar width based on a bar code;
   converting the detected bright and dark information into binary information and producing a plurality of bar width count values;
   storing the bar width count values;
   sequentially outputting the bar width count values on a first-in, first-out basis;
   detecting one of the bar width count values as error information when plural pieces of bar code bright and dark information do not come alternately in a bar width count value storing operation; and
   storing only the last of a continuous series of bar width count values detected as error information and erasing the other bar width count values detected as error information.

2. A bar code reader comprising:
   a bright and dark information detector detecting bright and dark information of a bar width based on a bar code;
   a bar width counter converting the detected bright and dark information detected by said bright and dark information detector into binary information and producing a plurality of bar width count values;
   bar width count value storing means for storing the plurality of bar width count values and sequentially outputting the plurality bar width count values on a first-in, first-out basis;
   error information detecting means for detecting one of the bar width count values as error information when plural pieces of bar code bright and dark information do not come alternately; and
   control means for controllably storing, in said bar width count value storing means, only the last of a continuous series of bar width count values detected as error information.

3. A bar code reader according to claim 2, wherein said first control means erases a previous one of the continuous series of bar width count values detected as error information.

4. A bar code reading method comprising the steps of:
   detecting bright and dark information of a bar width based on a bar code;
   converting the detected bright and dark information into binary information and producing a plurality of bar width count values;
   storing the plurality of bar width count values;
   sequentially outputting the plurality of bar width count values in a first-in, first-out basis; and
   storing only the last of a continuous series of bar width count values having at least a predetermined value, and erasing the remaining bar width count values having at least the predetermined value.

5. A bar code reader comprising:
   bright and dark information detector detecting bright and dark information of a bar width based on a bar code;
   a bar width counter converting the detected bright and dark information detected by said bright and dark information detector into binary information and producing a plurality of bar width count values;
   bar width count value storing means for storing the plurality of bar width count values and sequentially outputting the plurality of bar width count values on a first-in, first-out basis;
   an overflow detector for judging whether each of said bar width values has a predetermined value or more; and
   control means for controlling the storing said bar width count value storing means, of only the last one of a continuous series of bar width count values having the predetermined value or more.

6. A bar code reader according to claim 5, wherein said control means erases a previous one of the continuous series of bar width count values having a value larger than the predetermined value.

7. A bar code reading method comprising the steps of:
   detecting bright and dark information of a bar width based on a bar code;
   converting the detected bright and dark information into binary information and producing a plurality of bar width count values;
   storing the plurality bar width count values;
   sequentially outputting the plurality of bar width count values on a first-in, first-out basis;
   detecting one of the bar width count values as error information when the bar code bright and dark information does not come alternately in a bar width count value storing operation;
   storing only the last of a first continuous series of bar width count values and erasing the remaining bar width count values detected as error information; and storing only the last of a second continuous series of bar width count values having at least a predetermined value and erasing the remaining bar count values having at least the predetermined value.

8. A bar code reader comprising:

a bright and dark information detector detecting bright and dark information of a bar width based on a bar code;

a bar width counter for converting the detected bright and dark information detected by said bright and dark information detector into binary information and producing a plurality of bar width count values;

bar width count value information storing means for storing the plurality of bar width count values and sequentially outputting the plurality of bar width count values on a first-in, first-out basis;

error information detecting means for detecting one of the plurality of bar width count values as error information when plural pieces of bar code bright and dark information do not come alternately;

an overflow detector detecting bar width count values having a predetermined value or more; and control means for controllably storing only the last bar width count values detected as error information, and for controllably storing only the last of a second series of bar width count values having a value larger than the predetermined value.

9. A bar code reader according to claim 8, wherein said control means erases a previous one of the first continuous series of bar width count values detected as error information and erases a previous one of the second series of bar width count values having a value larger than the predetermined value.

* * * * *

UNITED STATES PATENT AND TRADEMARK OFFICE
CERTIFICATE OF CORRECTION

PATENT NO. : 6,612,491 B1 Page 1 of 1
DATED : September 2, 2003
INVENTOR(S) : Isao Iwaguchi et al.

It is certified that error appears in the above-identified patent and that said Letters Patent is hereby corrected as shown below:

<u>Title page, Item [54] and Column 1, line 1,</u>
After "BAR CODE", change "READING" to -- READER --.

Signed and Sealed this

Ninth Day of December, 2003

JAMES E. ROGAN
*Director of the United States Patent and Trademark Office*